G. ODIERNO.
MUD PROTECTOR FOR VEHICLES.
APPLICATION FILED MAR. 17, 1919.
1,325,166.
Patented Dec. 16, 1919.
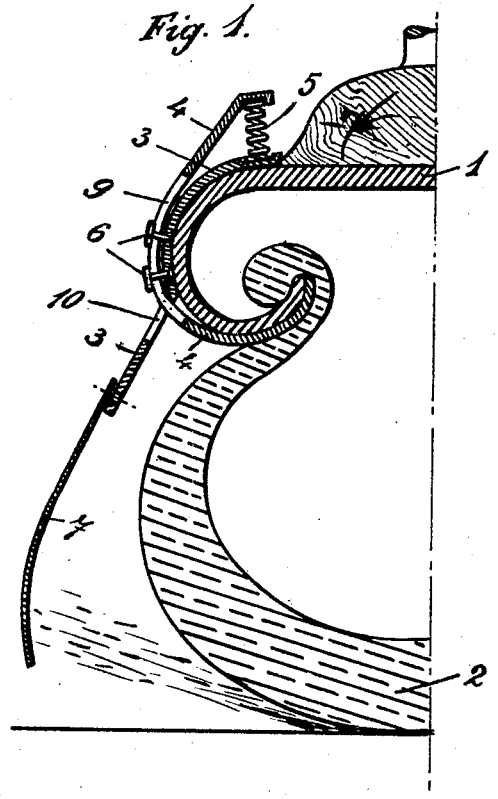
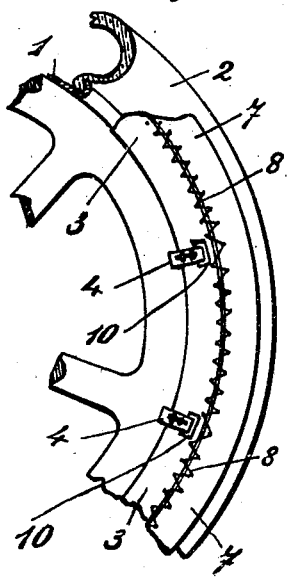
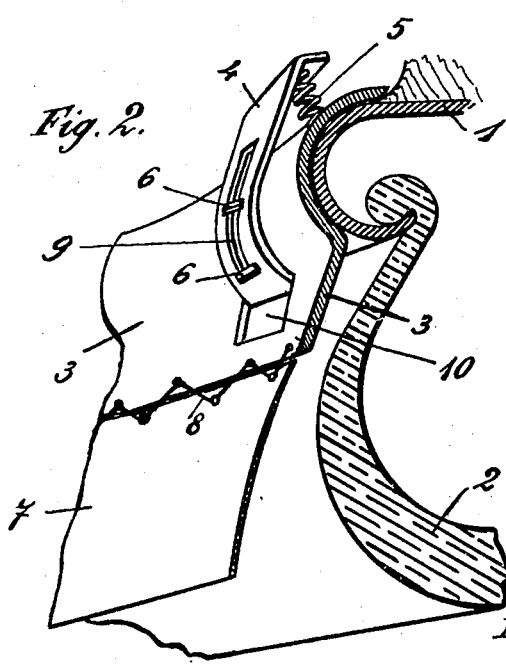
Inventor
G. Odierno.
By H. R. Kerslake
Atty.

UNITED STATES PATENT OFFICE.

GIOVANNI ODIERNO, OF MILAN, ITALY.

MUD-PROTECTOR FOR VEHICLES.

1,325,166.  Specification of Letters Patent.  Patented Dec. 16, 1919.

Application filed March 17, 1919. Serial No. 283,178.

*To all whom it may concern:*

Be it known that I, GIOVANNI ODIERNO, captain in the Italian Army, a subject of the Kingdom of Italy, and resident of Milan, Italy, Via Bigli N. 19, have invented certain new and useful Improvements in Mud-Protectors for Vehicles, of which the following is a specification.

The present invention comprehends generally improvements in wheel attachments and more particularly relates to an improved mud protector.

It is the primary aim and object of this invention to provide a device of the above mentioned character of an annular form designed to be quickly attached to and detached from the wheels of a vehicle with the purpose of preventing the splashing or throwing of mud on the occupants of the vehicle or upon the occupants of another vehicle which is being passed by the vehicle carrying the attachment.

More particularly this invention consists in the provision of a device of the above mentioned character wherein the supporting and attaching member is of improved construction and is designed for rapid snapping on and off of the wheel rim, and in addition is constructed so as to be capable of embracing rims of different shapes.

Other objects, as well as the nature, characteristic features and the scope of this invention will be more readily apparent from the following description taken in connection with the accompanying drawings and pointed out in the claims, forming a part of this specification.

The invention is clearly illustrated in the accompanying drawings, in which:—

Figure 1 is a fragmentary cross sectional view of an automobile-wheel showing the attachment in place.

Fig. 2 is a fragmentary side elevational view on a smaller scale of the same, and, Fig. 3 is a fragmentary perspective view of a wheel and the attachment applied thereto.

Similar characters of reference are employed in all of the above described views, to indicate corresponding parts.

Referring now, more particularly, to the accompanying drawing there is illustrated a wheel including a rim 1 on which is mounted a tire 2 while associated with the outer edge of the rim is an improved circular metallic supporting plate 3 which is brought into engagement with the rim by means of steel plates 4. These plates cross said supporting plate through apertures 10 positioned at suitable intervals throughout the said plate. Rivets 6 hold the plates 4 and the supporting plate 3 together, and are each provided with an oblong head to allow of relative motion between the plates owing to the provision of a longitudinal slot 9 in the plates. By reason of the oblong heads of the bolts the latter may be inserted through the slots 9 and subsequently given a quarter turn and arranged transversely across the slots 9 to prevent accidental disengagement of the parts.

A circular strip of stiff cloth 7 is now employed and forms the mud protector proper being properly secured to the plate 3 through the instrumentality of a lacing 8 as indicated in the drawing.

Springs 5 are now provided and are inserted and tensioned between the plates 4 and the supporting plate 3 having the privilege of setting the latter into contact with the rim 1 whatever may be the curvature of the edge thereof. Owing to the necessary flexibility of the plate 4 and to the action of the springs 5, the entire apparatus may be easily snapped into engagement with the rim and detached therefrom, as is apparent.

It is believed in view of the foregoing description further detail description of the operation of the invention is entirely unnecessary. Likewise it is believed that the advantages of the invention will be readily apparent.

Having now fully described the invention what is claimed as new and desired to be secured by Letters Patent is:—

1. In combination with a wheel having a rim, a mud protector arrangement comprising a circular plate member mounted on said rim and provided with an apertured extension, plates engaged with the rim and passing through the apertures in said extension, fastenings between said supporting plate member and plates and springs inserted and tensioned between the outer ends of said circular plate member and said plates to allow a tight engagement of said arrangement with said rim and to permit of a quick engagement and disengagement of the arrangement with said rim.

2. The combination with a wheel rim of the circular supporting plate associated with the side edge of the rim and provided with a radial extension having apertures therein at suitable intervals, fastenings plates for said supporting plate engaged with said rim and crossing said supporting plate through the apertures, means for fastening said plates on said supporting plate, springs for retaining said plates and said supporting plate in connection with said rim and permitting of a quick engagement and disengagement of all of the plates from the rim, and an annular and flexible mud protector connected to and projecting radially from the radial extension of the supporting plate.

In testimony whereof I have affixed my signature in presence of two witnesses.

GIOVANNI ODIERNO.

Witnesses:
G. G. GUAVNIERI,
R. L. McLAUGHLIN.